Feb. 18, 1930.  G. R. MAUPIN  1,747,376
TUBE EXPANDER AND FLARER
Filed April 5, 1928  2 Sheets-Sheet 1
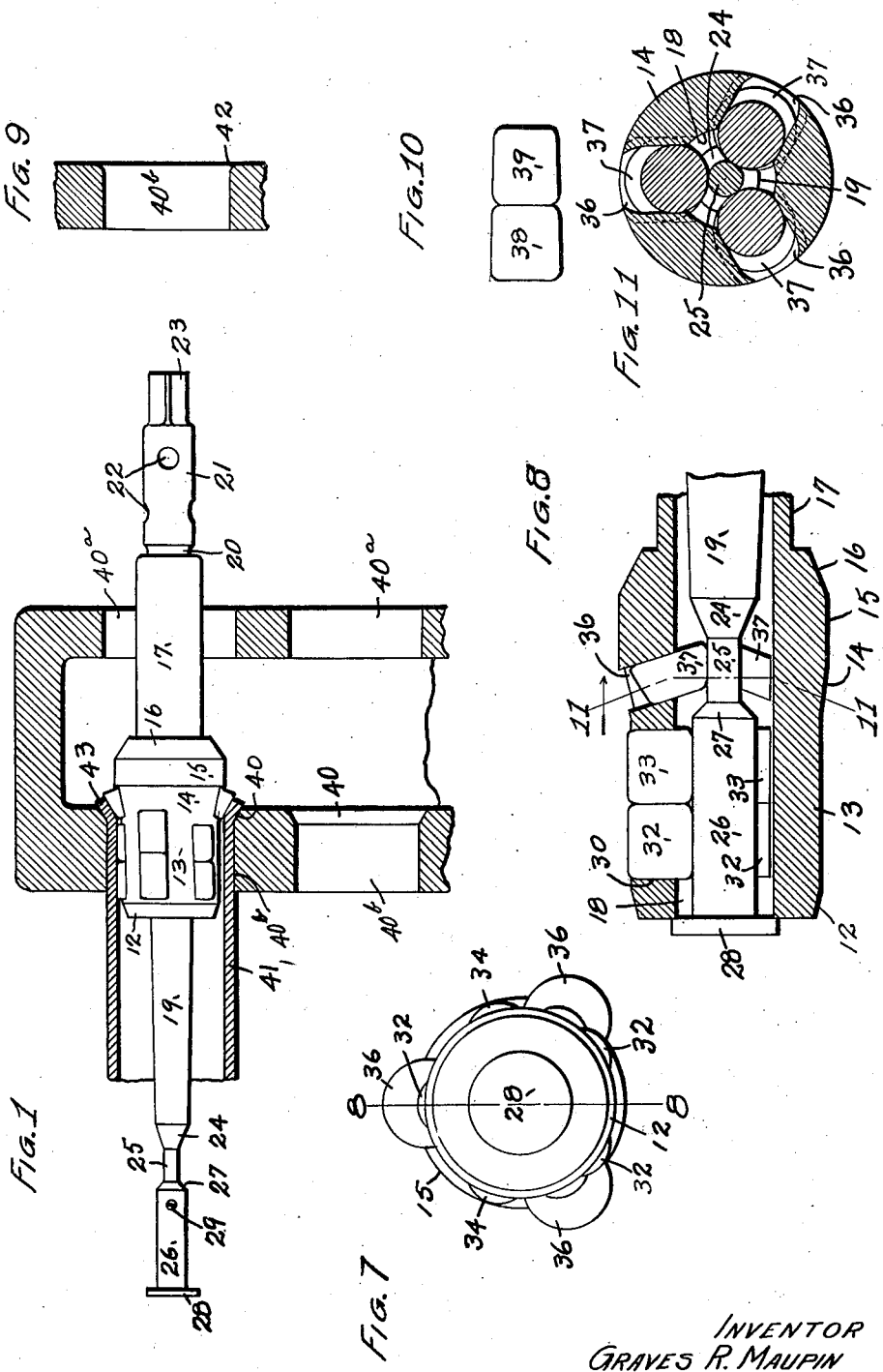
INVENTOR
GRAVES R. MAUPIN
By Edward E. Longan
ATTY.

Feb. 18, 1930. G. R. MAUPIN 1,747,376
TUBE EXPANDER AND FLARER
Filed April 5, 1928    2 Sheets-Sheet 2
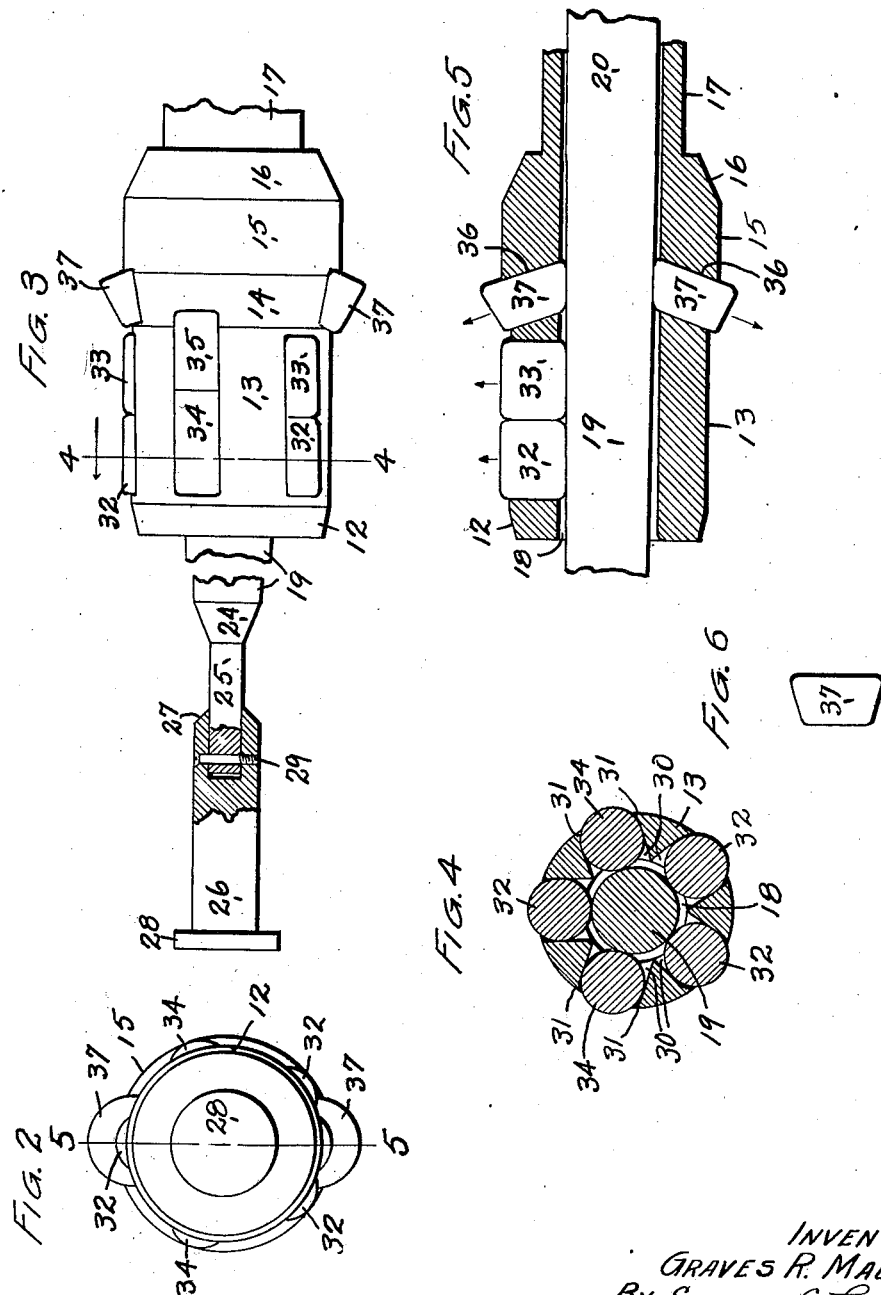
INVENTOR
GRAVES R. MAUPIN
BY Edward E. Longan
ATTY.

Patented Feb. 18, 1930

1,747,376

UNITED STATES PATENT OFFICE

GRAVES R. MAUPIN, OF MOBERLY, MISSOURI, ASSIGNOR TO THE J. FAESSLER MANU-FACTURING COMPANY, A COPARTNERSHIP COMPOSED OF ELIZABETH FAESSLER, CHRISTINIA FAESSLER, LOUIS E. FAESSLER, AND GRAVES R. MAUPIN, ALL OF MOBERLY, MISSOURI

TUBE EXPANDER AND FLARER

Application filed April 5, 1928. Serial No. 267,527.

My invention relates to improvements in tube expanders and flarers, and has for its primary object a tube expander and flarer which is provided with separate expanding and flaring rollers, all of the rollers however being controlled by a single mandrel.

A still further object is to construct a tube expander and flarer in which certain of the rollers are directed radially outward and face parallel to the axis of the tube and the flaring rollers directed outwardly at an angle to the axis of the tube and toward the seat of the tubes.

A still further object is to construct a tube expander and flarer which will feed itself longitudinally through the tube for a predetermined distance or until its longitudinal movement is halted by excess pressure and then commence to expand the tube radially and simultaneously therewith flare the end of the tube.

A still further object is to construct a tube expander and flarer by means of which tubes can be expanded in their seats and their projecting ends simultaneously flared without imparting any longitudinal stress to the tube as a whole.

In the drawings:

Fig. 1 is a view of my device showing a tube expanded in a header, the header and tube being in section;

Fig. 2 is an enlarged end view of my expander and header;

Fig. 3 is a side elevation of the same with parts broken away and parts in section;

Fig. 4 is a cross-section taken on the line 4—4 of Fig. 3 looking in the direction indicated by the arrow;

Fig. 5 is a vertical section taken on the line 5—5 of Fig. 2;

Fig. 6 is a side elevation of one of the flaring rollers employed;

Fig. 7 is a modified form of construction such as is employed for thin walled tubes;

Fig. 8 is a section taken on the line 8—8 of Fig. 7 showing the rolls in collapsed position;

Fig. 9 is a fragmental sectional view of a different form of preparing the tube seat than that illustrated in Fig. 1;

Fig. 10 is a plan view of the expanding rollers employed when heavy tubes are to be flared; and Fig. 11 is a section taken on the line 11—11 of Fig. 8 and illustrating the flaring rollers in collapsed position.

In the construction of my device I employ a cage which has a forward tapered portion 12, a cylindrical portion 13, an intermediate or outwardly tapered portion 14, a cylindrical portion 15, and an inwardly tapered portion 16. Integral with the portion 16 is a shank or sleeve 17 which acts as a handle for introducing the tool through a hand hole. The entire cage as well as the sleeve 17 has a cylindrical bore 18 extending therethrough, which is for the reception of a tapered mandrel 19. The rear end of the mandrel 19 is cylindrical as indicated by the numeral 20 and has a portion 21 thereof enlarged. Through this enlarged portion I preferably form bores 22 for the reception of a bar so that the mandrel can be readily rotated.

To the rear of the cylindrical portion 21 is formed an angular portion 23, which is designed to receive a wrench or socket of a motor or similar turning device in the event it is not desired to use bars.

The forward portion of the mandrel 19 is provided with an abrupt taper 24 which terminates in a reduced cylindrical portion 25. This reduced cylindrical portion projects into a sleeve 26, which has its end 27 adjacent the cylindrical portion tapered, the opposite end being provided with a head 28. The sleeve 26 is secured to the reduced cylindrical portion 25 by means of a screw or similar fastening means 29.

The cylindrical portion 13 of the cage is provided with a plurality of radially extending slots 30, which are designed to receive sectional rollers. The ends of the slots adjacent the periphery of the member 13 are reduced in width as indicated by the numeral 31 so that the openings in the periphery of the member 13 will be slightly less than the diameter of the rollers thereby preventing the rollers from passing entirely beyond the periphery of the member 13. In other words, their outward radial movement is prevented.

Located in the radial openings 30 are rollers 32 and 33, which form pairs and rollers 34 and 35, which also form pairs. It will be noted, however, from Figs. 1 and 3, that the grooves or radial openings 30, in which the rollers 34 and 35 are located, are longer than the radial openings in which the rollers 32 and 33 are located. The purpose of this will be explained in detail later.

It will also be noted from Figs. 1 and 3 that the longitudinal axes of these openings extend at an angle to the longitudinal axis of the cage so that the longitudinal axis of the rollers when in position will be at an angle to the longitudinal axis of the cage and also of the mandrel. In this way the mandrel and tool are made self feeding. In other words, the rotation of the mandrel acting in conjunction with the angle of inclination of the rollers will cause the mandrel to feed forward when turned in one direction and as contact is made with the tube by the periphery of the rollers, this angle of inclination will also tend to feed the entire tool longitudinally of the tube.

The portions 14 and 15 of the cage are provided with openings 36, which openings extend at an angle to the diameter of the cage. In other words, these openings are inclined forwardly of the cage as illustrated in Figs. 5 and 8 so that when the mandrel 19 feeds forward, the rollers 32, 33, 34 and 35 will be fed out radially while the rollers 37 located in the openings 36 are not only fed outwardly but also toward the front end of the tool as indicated by the arrows in Fig. 5.

The rollers 37 are in the form of a truncated cone as illustrated in Fig. 6, the inclination of the face of the rollers controlling the amount of flare imparted to the end of the tube.

In Fig. 10 I have disclosed a modified form of roller in which the roller 38 is tapered and the roller 39 is also tapered. The roller 38 is designed to take the place of the roller 32 and the roller 39 of the roller 33 when exceptionally heavy tubes are to be flared. In this manner the tube while being expanded is made slightly larger at a point near the front end of the tool so that all backing out of the tool incident to the flaring operation is eliminated. In flaring tubes which have a relatively thin wall, these tapered expanding rollers are not necessary because the friction set up between the expanding rollers and the interior of the tube is sufficient to hold the tool in position during the flaring and prevents its backing out.

It will also be noted that the joints between the rollers 32 and 33 and 34 and 35 are broken so that any ridges left by one set of rollers will be ironed or smoothed out by the succeeding set. This is an additional feature in holding my tool against longitudinal movement in the tube because during the expanding and on account of the ends of the rollers being rounded, slight ridges will be formed, which prevent, or at least retard back movement of the tool. In other words, the tool will screw itself into the tube by forming slight threads but these threads will be immediately ironed out by a succeeding roller. Therefore, I am enabled to obtain considerable pressure against the end of the tube being rolled and expanded before the actual expansion and final flaring takes place.

It will also be noted from Figs. 1, 3 and 5 that there is considerable space left between the rollers 33 and the flaring rollers 37 and it is for this purpose that the rollers 34 and 35 are made longer than the rollers 32 and 33 because, if this were not done, there would be an inwardly projecting ridge formed between the rollers 33 and the expanding rollers 37 but by having at least two sets of rollers projecting beyond, this ridge or projection is rolled out.

In my device I have shown a plurality of rollers arranged in sets capable of radial projection, some of which sets are longer than others; and I have shown a plurality of flaring rollers, which are projected outwardly and at an angle inclined toward the front of the tool. The number of these rollers, especially the radially expansible rollers, may be varied to suit various diameters of tubes, as may be the flaring rollers. However, in regard to the flaring rollers, it is essential that at least two such rollers be used in order to obviate any tilting tendency of the tool while in operation as otherwise, instead of rolling the tube around, there might be a tendency to make it elliptical and thereby prevent its being seated tightly.

When it is desired to insert the tool through a hand-hole 40ª, the mandrel is withdrawn until it assumes the position illustrated in Fig. 8, in which instance the radially expanding rollers will rest on the sleeve 26, while the flaring rollers can be collapsed so as to contact with the reduced cylindrical portion 25 thus permitting the cage to be readily inserted through the hand hole 40ª and into the tube.

The mandrel is then pushed forward so that its tapered portion 19 will contact with the various rollers and then rotated by hand, which rotation, due to the inclination of the rollers, will cause the mandrel to feed forward until sufficient friction is set up to prevent any further hand rotation. Then, either bars are inserted in the openings 22 or the angular end 23 is attached to a rotating device and the mandrel further rotated. This causes the rollers which project radially to further bind the interior of the tube, feeding the cage forward longitudinally in the tube, it being understood, of course, that the rollers 37 are also rotated. Continued forward feeding of the cage and rotation of the rollers with the cage will cause the rollers 37 to commence to expand the tube until such time as the forward feeding of the tool is halted by excess strain. The mandrel, however, continues to rotate and gradually expands the tube and the flared portion and as this is gradually expanded and flared, the entire tool can feed forward again. This is continued until the tube is tightly seated and flared after which the mandrel is given a slight rotation in the opposite direction to release the rollers and then pulled back until the head 28 of the sleeve 26 strikes the cage, after which the entire tool is withdrawn. In this connection it is to be noted that the head 28 is larger than the bore 18 so that the mandrel can not be entirely withdrawn from the cage.

The manner in which the openings 40$^b$ through which the tubes 41 project are formed may be either by chamfering the edge of the opening 40$^b$ as indicated by the numeral 40 in Fig. 1, or it may be rounded as indicated by the numeral 42 in Fig. 9 so that the ends 43 of the tubes 41 can bend readily while being flared, or it may be left sharp. The sharp edge, however, I have found requires considerable skill in flaring so as not to cut off the flared portion of the tube or to cut into its outer surface during the flaring thus weakening the tube at this point. However, with very thin walled tubes, a sharp edge can be left and the thicker the wall of the tube, the blunter or more round the edge adjacent the tube should be.

Having fully described my invention, what I claim is:

1. A tube expander and flarer comprising a cage, a tapered mandrel extending therethrough and capable of longitudinal movement therein, a plurality of rollers carried by said cage, said rollers contacting with said mandrel and adapted to be projected radially beyond the periphery of said cage, certain of said rollers being of greater length than the remainder of said rollers, a plurality of tapered flaring rollers, carried by said cage in equally spaced circumferential relation to each other and located between the longer rollers, said rollers contacting with said mandrel and adapted to be moved outward and forwardly thereby whereby a tube is expanded and has its ends flared simultaneously, reduced portions formed on said mandrel intermediate its ends for permitting said rollers to recede into said cage, and means carried by one end of said mandrel for receiving a rotating means whereby said mandrel, rollers and cage can be rotated simultaneously.

2. A tube expander and flarer comprising a cage, a sleeve projecting from one end of said cage, a tapered mandrel extending therethrough and capable of longitudinal movement therein, a plurality of rollers carried by said cage, said rollers contacting with said mandrel and adapted to be projected radially beyond the periphery of said cage, certain of said rollers being of greater length than the remainder of said rollers, a plurality of tapered flaring rollers carried by said cage in equally spaced circumferential relation to each other and having their forward edges projecting beyond the rear edges of the longer rollers, said rollers contacting with said mandrel and adapted to be moved outward and forwardly thereby whereby a tube is expanded and has its ends flared simultaneously, a reduced portion formed on said mandrel for permitting said rollers to pass into said cage a predetermined distance, and means on one end of said mandrel for receiving a rotating means whereby said mandrel, rollers and cage can be rotated simultaneously.

3. A tube expander and flarer comprising a cage circular in cross-section and having a cylindrical bore extending longitudinally therethrough, circumferentially spaced openings formed through the wall of said cage adjacent its rear end, said openings inclining forwardly, radially extending openings formed in said cage and extending longitudinally thereof, certain of said openings having their rear ends extending rearward of the forward edge of the inclined openings, flaring rollers located in said inclined openings, a plurality of expanding rollers mounted in the radially extending openings, a tapered mandrel extending through said cage and capable of longitudinal movement therethrough for simultaneously projecting all of said rollers beyond the periphery of said cage, said mandrel being provided at its large end with means for receiving a rotating means so that said cage, rollers and mandrel can be rotated simultaneously, a reduced cylindrical portion formed on the small end of said mandrel, and a cylindrical sleeve carried by said reduced portion adjacent its ends whereby said rollers are permitted to pass into the cage while removing or inserting the same.

4. A tube expander and flarer comprising a cage, a sleeve carried thereby, expanding rollers carried by said cage and adapted to have their peripheries projected beyond the periphery of the cage, the longitudinal axis of said rollers being at an angle to the longitudinal axis of said cage, a mandrel having a tapered portion movable centrally through said cage and adapted to contact with said rollers for causing said projection, and separate flaring rollers carried by said cage, said flaring rollers adapted to be contacted with by said mandrel and moved outward from said cage at an angle less than 90 degrees to the longitudinal axis of said cage by said mandrel.

5. A tube expander and flarer comprising a cage, a sleeve carried thereby, expanding rollers carried by said cage and adapted to have their peripheries projected beyond the periphery of the cage, the longitudinal axis of said rollers being at an angle to the longitudinal axis of said cage, a mandrel having a tapered portion intermediate its ends and movable centrally through said cage and adapted to contact with said rollers for causing said projection, and separate flaring rollers carried by said cage, said flaring rollers being located between certain of said first mentioned rollers adapted to be contacted with by said mandrel and moved outward and forward simultaneously by said mandrel.

6. A tube expander and flarer comprising a cage, a sleeve carried thereby, expanding rollers carried by said cage and adapted to have their peripheries projected beyond the periphery of the cage, the longitudinal axis of said rollers being at an angle to the longitudinal axis of said cage, a mandrel having tapered portions and movable centrally through said cage and adapted to contact with said rollers for causing said projection, separate flaring rollers carried by said cage, said flaring rollers adapted to be contacted with by said mandrel and moved outward at an angle less than 90 degrees to the longitudinal axis of said cage by said mandrel, means carried by the ends of said mandrel for preventing its removal from the cage, and a reduced portion formed on said mandrel for permitting the expanding and flaring rollers to move into said cage.

7. A tube expander and flarer comprising a cage, a sleeve carried thereby, expanding rollers carried by said cage and adapted to have their peripheries projected beyond the periphery of the cage, the longitudinal axis of said rollers being at an angle to the longitudinal axis of said cage, a mandrel having a tapered portion and movable centrally through said cage and adapted to contact with said rollers for causing said projection, separate flaring rollers carried by said cage, said flaring rollers adapted to be contacted with by said mandrel and moved outward and forward simultaneously by said mandrel, means carried by the ends of said mandrel for preventing its removal from the cage, and a reduced portion formed on said mandrel adjacent one end for permitting the expanding and flaring rollers to move into said cage.

In testimony whereof I have affixed my signature.

GRAVES R. MAUPIN.